W. C. RENCH.
Dog-Power Machine.
No. 214,005. Patented April 8, 1879.
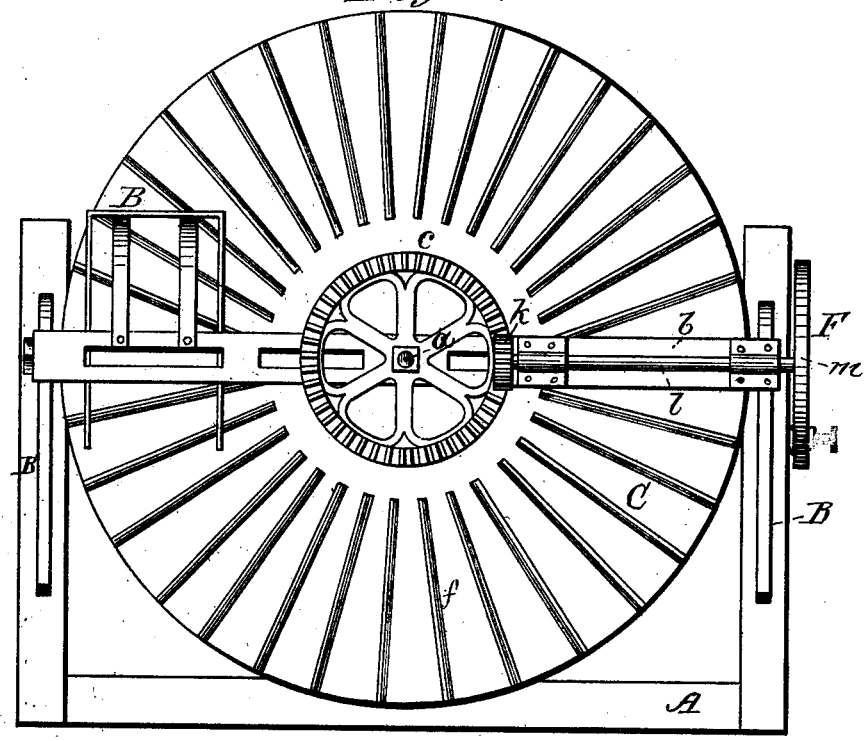
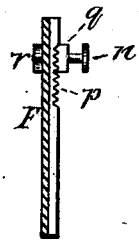
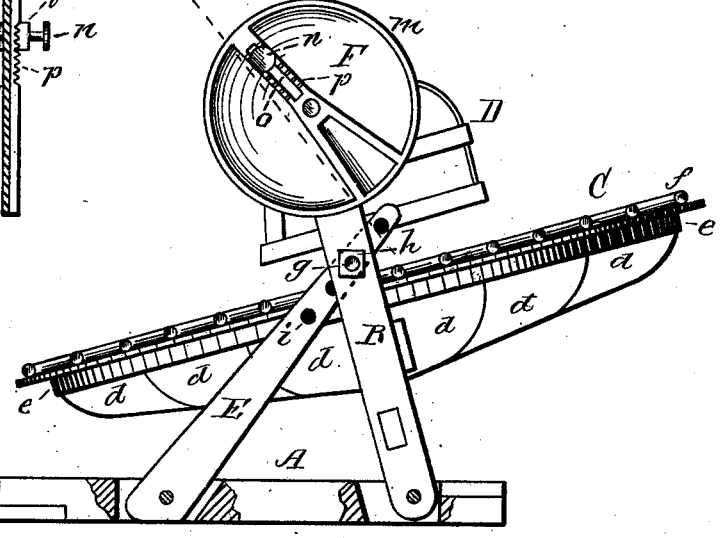
WITNESSES
Nat. E. Oliphant
Geo. B. Porter
INVENTOR
William C. Rench
per Chas. H. Fowler,
Attorney.

UNITED STATES PATENT OFFICE.

WILLIAM C. RENCH, OF ROYERTON, INDIANA.

IMPROVEMENT IN DOG-POWER MACHINES.

Specification forming part of Letters Patent No. 214,005, dated April 8, 1879; application filed February 24, 1879.

*To all whom it may concern:*

Be it known that I, WILLIAM C. RENCH, of Royerton, in the county of Delaware and State of Indiana, have invented a new and valuable Improvement in Dog-Power Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top-plan view of my invention. Fig. 2 is a side elevation, partly in section; and Fig. 3 is a detail view of the belt or wrist-wheel, taken on line $x$ $x$ of Fig. 2.

This invention has relation to that class of machines in which the power is obtained by the weight of a dog or other animal while traveling upon a drum or endless track, which is made to rotate, and, by suitable connections, to operate and drive the dasher of a churn, pump-rod, or other device, as required.

The purpose of the present invention is to construct a dog-power machine that can be readily and easily operated by the animal, and so connecting the tread-wheel to its supports as to admit of its adjustability to increase or diminish its speed; also, in constructing the wrist-wheel and its connections so that the point at which the rod or shaft is connected to the wheel may be varied or changed, so as to lessen or change the distance from the periphery to the center thereof to suit the different size pumps and churns, as will be hereinafter described, and subsequently pointed out in the claim.

In the accompanying drawings, A represents a suitable support, to which is pivoted a frame, B. The tread-wheel C, which may be of any suitable form and construction, is supported within the frame B by the central spindle, $a$, to which the wheel is rigidly connected, the lower end of the spindle having its bearing in the lower cross-piece of the frame, while the upper end passes through the cross-piece $b$, and has keyed to it a driving-wheel, $c$. To the cross-piece or beam $b$ is suspended a skeleton stall, D, for the dog or other animal. The tread-wheel C being connected to the frame B, and the latter pivoted to the support A, the frame being capable of adjustment to different angles in relation to the support A, it also increases or decreases the angle or incline position of the tread-wheel C, thereby regulating the speed of said wheel—the greater the incline position of the wheel the greater the speed. The tread-wheel C, upon its under side, is strengthened by webs $d$ and rim $e$, and upon its upper side has slats $f$, suitably connected thereto, and the required distance apart to furnish foot-hold for the animal.

The frame B is held and supported at the desired angle or inclination by braces E, the lower ends of which are pivoted to the support A, and the upper ends passing through elongated slots in the ends of the frame.

When desired to change the inclination of the frame, and with it the tread-wheel, the bolts $g$, which pass through the ends of the frame and braces, are removed by unscrewing the nuts $h$, and the bolts replaced through one of a series of holes, $i$, in the braces, and the nuts $h$ secured to the ends of the bolts by screwing them up tightly, when the machine will stand in as strong and solid position as required, and the frame firmly held at the necessary inclination.

Meshing with the teeth of the wheel $c$ is a pinion, $k$, to which is rigidly fixed a horizontal shaft, $l$, the outer end of the shaft having affixed thereto the balance-belt or wrist-wheel F. The wheel F is of sufficient width at its periphery, or is formed with a rim, $m$, of the required width, to receive a driving-belt, when desired to so use said wheel F. The wheel F may also be used as a wrist-wheel, for connecting thereto the shaft of a pump or churn-dasher. To provide for this, and the adjustability of the wrist, the wrist, as represented at $n$, passes through an elongated slot, $o$, from near the periphery of the wheel F to the center thereof. Upon each side of the slot $o$ is a ratchet, $p$, for engaging with the ratchet-teeth $q$ of the wrist $n$.

When it is desired to bring the wrist $n$ nearer to or from the center of the wheel F, a nut, $r$, is loosened upon the rear end of the wrist, which disengages the teeth of the wrist with those upon the wheel F, when the wrist can be moved in the slot o to or from the center of the wheel, and securely held in place by tightening up the nut r.

The adjustability of the wrist admits the regulating of the stroke to suit the different size pumps and churns.

Having now fully described my invention, what I claim as new, and desire to secure by Letters Patent, is—

A dog or other power machine, consisting of a frame, B, pivoted to the support A, and carrying the tread-wheel C, in combination with the pivoted braces E, provided with holes i, and bolts and nuts g h, said tread-wheel being connected with a belt or wrist-wheel, provided with means for adjusting the wrist to regulate the stroke of the shaft connected to the pump or churn, substantially as and for the purpose set forth.

In testimony that I claim the above I have hereunto subscribed my name in the presence of two witnesses.

WILLIAM C. RENCH.

Witnesses:
 ELI B. STUDEBAKER,
 GEORGE S. SHEETS.